United States Patent [19]
Tominaga et al.

[11] Patent Number: 5,121,385
[45] Date of Patent: Jun. 9, 1992

[54] HIGHLY EFFICIENT MULTIPLEXING SYSTEM

[75] Inventors: Syoji Tominaga; Yukihiro Ando; Takao Matsuda, all of Yokohama; Takashi Sato, Kawasaki; Koji Maruyama, Yokohama, all of Japan

[73] Assignee: Fujitsu Limited, Kawasaki, Japan

[21] Appl. No.: 407,949

[22] Filed: Sep. 14, 1989

[30] Foreign Application Priority Data

Sep. 14, 1988 [JP] Japan .................................. 63-230651

[51] Int. Cl.⁵ .............................................. H04J 3/14
[52] U.S. Cl. ........................................ 370/80; 370/112
[58] Field of Search ............... 370/80, 81, 94.1, 94.2, 370/110.1, 111, 112

[56] References Cited

U.S. PATENT DOCUMENTS

| | | | |
|---|---|---|---|
| 4,284,850 | 8/1981 | Clingenpeel | 370/81 |
| 4,445,213 | 4/1984 | Baugh et al. | 370/80 |
| 4,813,040 | 3/1989 | Futato | 370/111 |
| 4,956,839 | 9/1990 | Torii et al. | 370/94.1 |

Primary Examiner—Benedict V. Safourek
Assistant Examiner—Min Jung
Attorney, Agent, or Firm—Staas & Halsey

[57] ABSTRACT

The period of a sound-existence/sound-silence of a speech signal is detected. Packet data is inserted in a speech time slot during the period of non-existence of sound in the speech signal. A time slot is also given to the non-speech data requiring a quick response in transmission so that the non-speech data is multiplexed with the speech signal for transmission. Data-non-existence of non-speech data is detected when the non-speech data does not exist and then the packet data is inserted into a time slot of the non-speech data for transmission.

27 Claims, 9 Drawing Sheets

HIGHLY EFFICIENT MULTIPLEXING SYSTEM

BACKGROUND OF THE INVENTION

The present invention relates to a multiplexing transmission system in which packet data is inserted into a sound-silent period of a digitized speech signal and in which other data is multiplexed with the digitized speech signal.

In this type of multiplexing transmission system, wherein data is transmitted as packet data, it is necessary to form data into a packet and later extract it from the packet. This requires a relatively long transmission response time. However, some data requires a quick response to provide transmission without substantial delay. Therefore, this method is not suitable where a quick response is required.

The present invention provides a multiplexing transmission system which is suitable for data transmission requiring a quick response and which can achieve a high transmission efficiency.

Figure 1:
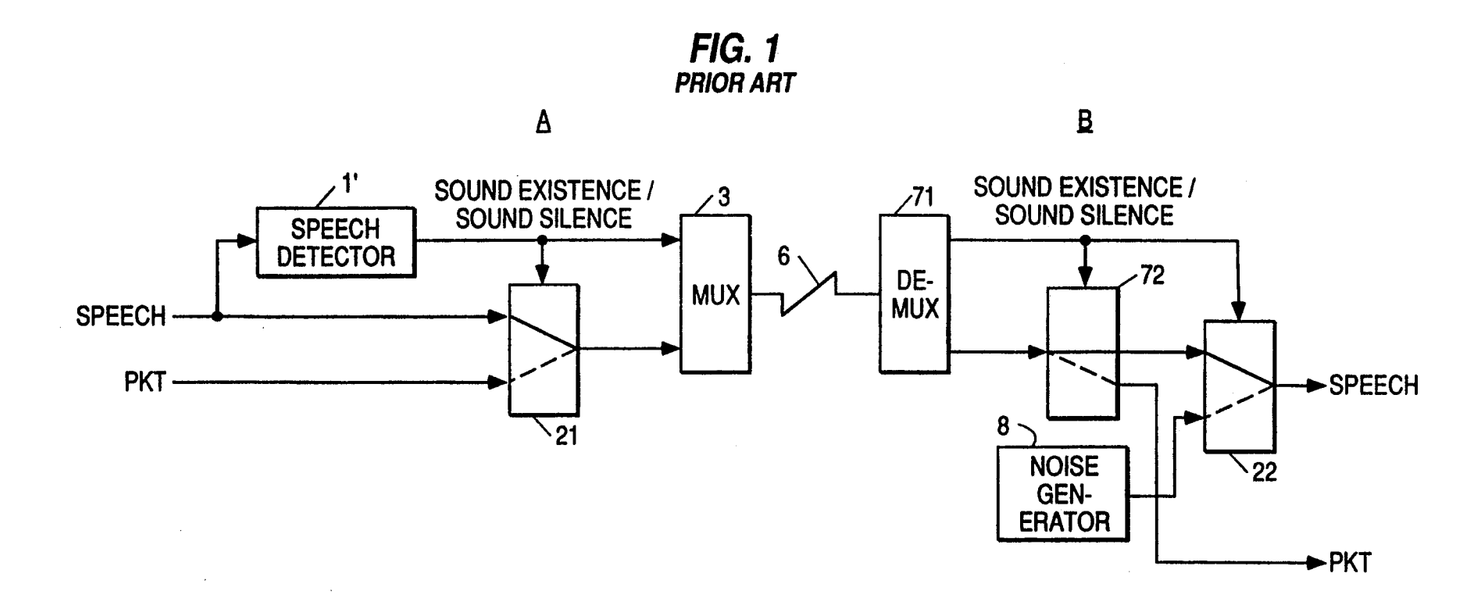
FIG. 1 is a block diagram of a prior art data transmission system.

A prior art multiplexing transmission system transmits packet data in a sound-silent period of prior art system. A speech detector 1' detects sound-existing-/sound-silent periods of digitized speech. A selector 21 passes speech when the output (sound-existing/sound-silent) from detector 1' indicates a sound-existing period and passes packet data (PKT) when the output from detector 1' indicates a sound-silent period. Multiplexer 3 arranges the output of selector 21 and the output of speech detector 1' in a time sequence. This explains the structure of the transmission side A. Speech, packet data (PKT) and a sound-existing/sound-silent bit are multiplexed with priority given to speech, and the multiplexed signal is transmitted to the receiving side B through transmission path 6.

On receiving side B, a demultiplexer (DEMUX) 71, a distributor 72, a selector 22 and a noise generator 8 are provided. The DEMUX 71 separates the sound-existing/sound-silent bits from the speech/PKT data. The distributor 72 is switched by the extracted sound-existing/sound-silent bits so that when a sound-existing bit is present, the signal at that time, namely, speech, is transmitted to the selector 22, and when a sound-silent bit is present, the signal at that time, namely, the PKT, is transmitted to the output terminal. The selector 22 is also switched by a sound-existing/sound-silent bit. The selector 22 selects speech output from the distributor 72 in response to the sound-existing bit, and selects the output of the noise generator 8 in response to a sound-silent bit. In this manner, the speech and packet data are subjected to a separation and extraction on the receiving side and noise is inserted into a sound-silent period, thereby forming a similar signal to that on the transmitting side. In the multiplexing system of FIG. 1 speech is given priority and data is formed into a packet. This system cannot process data which requires a quick response, thus there is no way of transmitting data other than by separately providing a simple multiplexing method, i.e. by providing an exclusive time slot. However, if this separate time slot is used only for data which are not subjected to a packet, nothing is transmitted during a data-absence period. As a result, the total transmission efficiency is not improved.

SUMMARY OF THE INVENTION

An object of the present invention is to provide a highly efficient multiplexing system which can transmit non speech data requiring a quick response as required by speech and does not decrease the transmission efficiency of the transmission line.

A feature of the present invention resides in a highly efficient multiplexing system comprising first means for detecting a sound-existing and sound-silent period of a digitized speech signal, means for inserting packet data into a speech time slot during a sound-silent period of the speech signal in response to an output from the detecting means, means for providing a time slot to non-speech data requiring a quick response, thereby enabling the non-speech data to be multiplexed with the speech signal, second means for detecting a data existence and a data non-existence of the non speech data, and means for inserting the packet data into the time slot of the non-speech data during a period of non-speech data non-existence in response to an output of the second detecting means.

Another feature of the present invention resides in a highly efficient multiplexing system comprising means for providing a time slot to non-speech data, requiring a quick response, means for detecting non-existence of non-speech data, and means for inserting packet data into a time slot of the non-speech data during a period of non speech data non-existence in response to an output of the detecting means.

DETAILED DESCRIPTION

Figure 2:
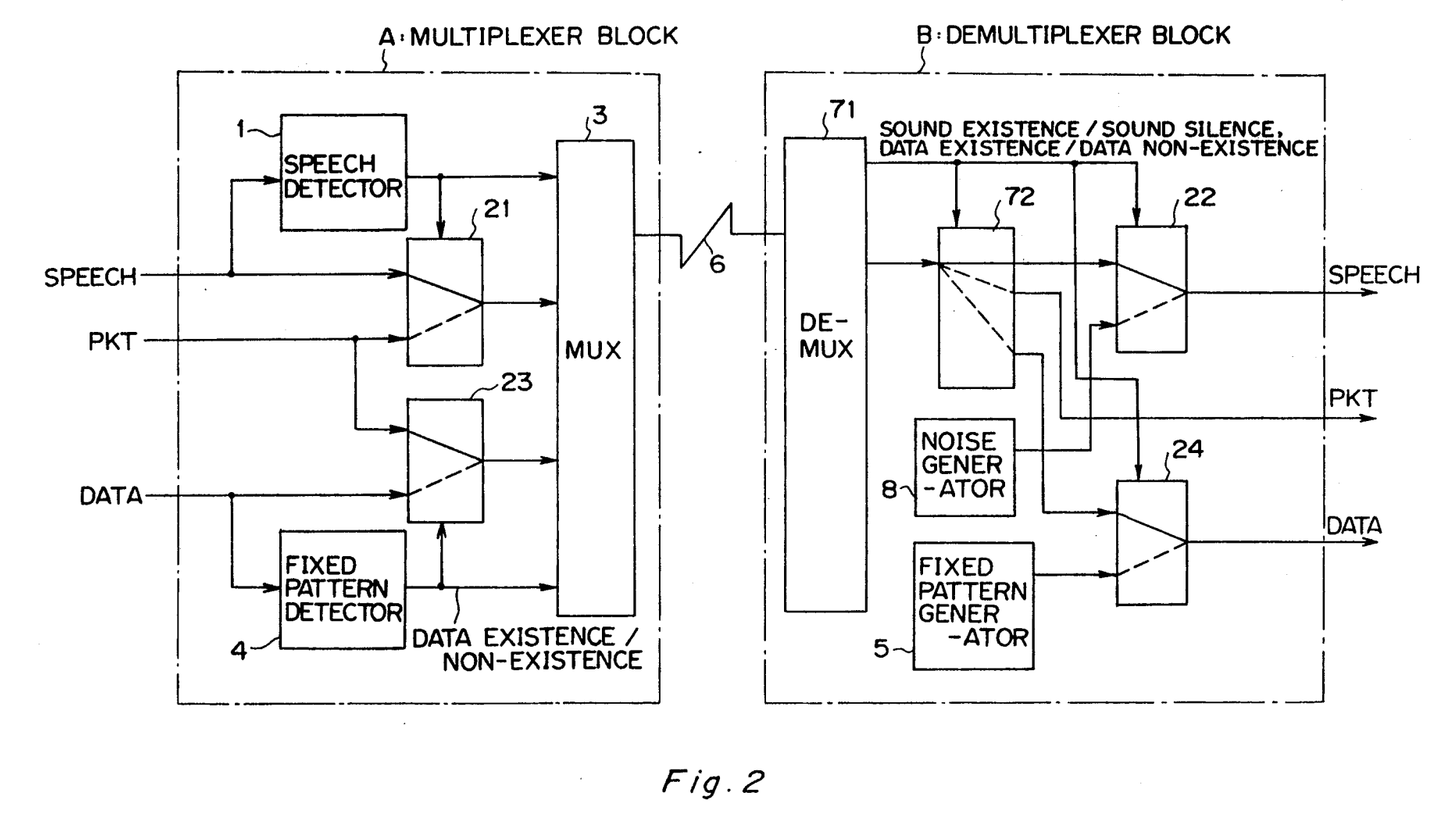
FIG. 2 is a block diagram showing an operating principle of the present invention.

In FIG. 2, A is a multiplexer block on the transmitting side, B is a demultiplexer block on the receiving side, and 6 is a time division transmission path connecting these blocks. Elements which are the same as those in FIG. 1 have same reference numerals. The present invention as shown in FIG. 2 is at least different from the prior art method shown in FIG. 1, in that the selector 23 and the fixed pattern detector 4 are added to block A and the selector 24 and the fixed pattern generator 5 are added to block B. The distributor 72 transmits three kinds of outputs of the DEMUX 71, i.e. speech, PKT and data, to respective outputs in accordance with bits representing sound-existing/sound-silent and data-existing/data-non-existing periods.

A speech detector 1 detects sound-existing periods and sound-silent periods of an input speech signal, and thereby produces outputs representing existence of sound and absence of sound. Since the input speech signal includes noise, it may seem that a signal always exists even when there is no input speech signal. However, speech is different from noise in respect of power and pitch. Speech has larger power than noise and also has pitch, whereas noise has no pitch. Therefore, based on these differences, speech (a sound-existing signal) and noise (a sound-silent signal) can be distinguished from each other. The output (sound-existence/sound-silence) of the speech detector 1 is input to the selector 21, and thereby switches the selector 21 (so that it selects speech when sound exists, and selects packet data when sound does not exit). The output of the detector 1 is also input to the multiplexer (MUX) 3 and is subjected to a multiplexing operation therein. It is thereafter transmitted to the receiving side.

The fixed pattern detector 4 detects whether non-speech data requiring a quick response exists or not. Non-speech data requiring a quick response is, for example, used for a dialog type computer communication between a data terminal equipment and a computer or ATM (Asynchronous Transfer Mode). In the case of packet data PKT it takes time for a packet assembling process to be executed. Therefore, non-speech data requiring a quick response should be treated differently from packet data PKT. When non-speech data does not exist, for example, when a specific pattern such as all "1" exists, the detector 4 detects data non-existence and produces an output showing data non-existence. This output (representing data-existence or data-non-existence) is applied to the selector 23 to perform a switching operation so that it selects data when non-speech data exists and selects packet data when non-speech data does not exist. The output of the selector 23 is simultaneously inputted to the multiplexer 3 to be multiplexed, and is thereafter transmitted to the receiving side.

The above switching of the selectors 21 and 23 enables speech, data, sound-existence /sound-silence bit and data-existence/data-non-existence bit to be multiplexed in a multiplexer 3 during the period of sound-existence and data-existence and thereafter the multiplexed signal is transmitted. Packet data (PKT) is transmitted to the multiplexer 3 through the selector 21 during the sound-silent period and through the selector 23 during the data-non-existence period. Accordingly, even when packet data (PKT) is not multiplexed on a speech line, it can be multiplexed on a non-speech data line, thereby decreasing delay in transmission of packet data and increasing the rate of use of the whole transmission line.

On the receiving side, the DEMUX 71 separates speech, PKT, data, a sound-existing/sound-silent bit and a data-existing/data-non-existing bit. The distributor 72 receives the sound-existing/sound-silent bit and the data existing and data-non-existing bit. If the bit shows sound existence, the distributor 72 transmits the input sound or speech to the selector 22. If the bit shows data-existence, the distributor 72 transmits the input data to the selector 24. If the bit shows sound non-existence or data non-existence, the distributor 72 transmits the input packet data to a PKT terminal. The selector 24 receives a data-existing/data-non-existing bit. In the case of data existence, the selector 24 selects the data output of the distributor 72 and in the case of data non-existence, it selects the output of the fixed pattern generator 5. The pattern generator 5 generates a fixed pattern (i.e., all "1") to designate data non-existence. This pattern is preferably the same as that detected by the detector 4 on the transmission side. The selector 22 receives the sound-existing/sound-non-existing bit. If sound exists, the selector 22 selects the speech output of the distributor 72 and if sound does not exist, it selects the output of noise generator 8, which produces random signals to simulate a sound-silent state in the input signal to the multiplexer block A. Owing to the operation of the distributor 72 and the selectors 22 and 24, the same data as on the transmission side can be reproduced on the receiving side.

Figure 3:
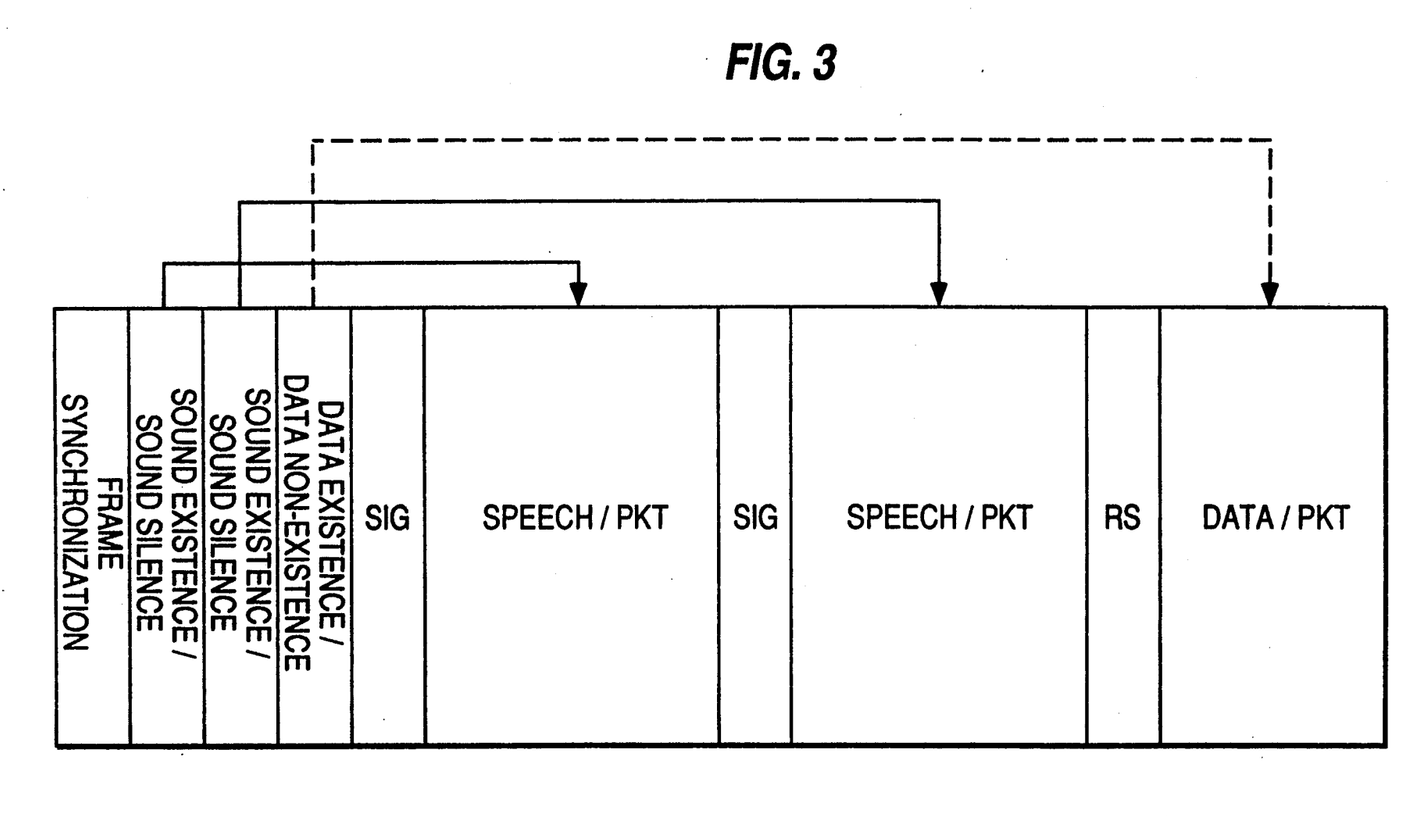
FIG. 3 is an explanatory view of a frame format.

FIG. 3 is a view for explaining a frame format of the present invention. The head bit is for frame synchronization. The following two bits show the output of speech detector 1 for two communication lines. These bits correspond to speech lines and are connected to respective bits in speech/PKT by solid lines. The following bit represents data existence or data non-existence output from the fixed pattern detector 4. For example, when this bit is "1", data exists, and the transmitted signal is data. When this bit is "0", data does not exist, and the transmitted signal is PKT. This bit representing data existence or data non-existence indicates whether data exists in the area connected thereto by the dashed line in FIG. 3. This fourth bit representing the data existence or data non-existence is newly introduced by the present invention.

Figure 4:
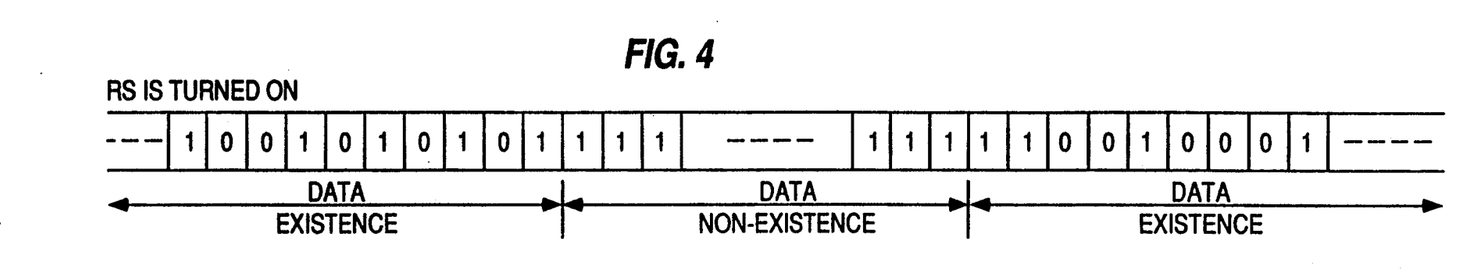
FIG. 4 is a view explaining a manner of determining whether data exists or not using the transmission system shown in FIG. 2.

The fixed pattern detector 4 determines whether data exists by detecting a predetermined fixed signal pattern, for example, as shown in FIG. 4, a pattern wherein the signal level "1" continues for a frame (i.e., a given number of bits). As an alternative, instead of detecting a predetermined fixed signal pattern, a bit RS (Request Send) can be turned on (i.e., level "1") upon data existence, and turned off (i.e., level "0") upon data non-existence. In this case, data existence or data non-existence can be detected by checking the RS bit. The first-mentioned method of detecting a predetermined fixed signal pattern is effective in a system where RS is ordinarily on. When the bit RS is ordinarily off, packet data is not transmitted irrespective of the output of the fixed pattern detector 4 .

On receiving side B, when the fourth bit representing data existence/data non-existence is 0, the packet data PKT is transmitted to the PKT terminal. In this case, the selector 24 is switched to the state shown by the dashed line, and the signal produced by the fixed pattern generator 5 (the fixed pattern wherein, for example, all the bits are "1") is coupled to the data output line. Therefore, the state on the transmitting side is also maintained on the receiving side with regard to data.

Figure 5:
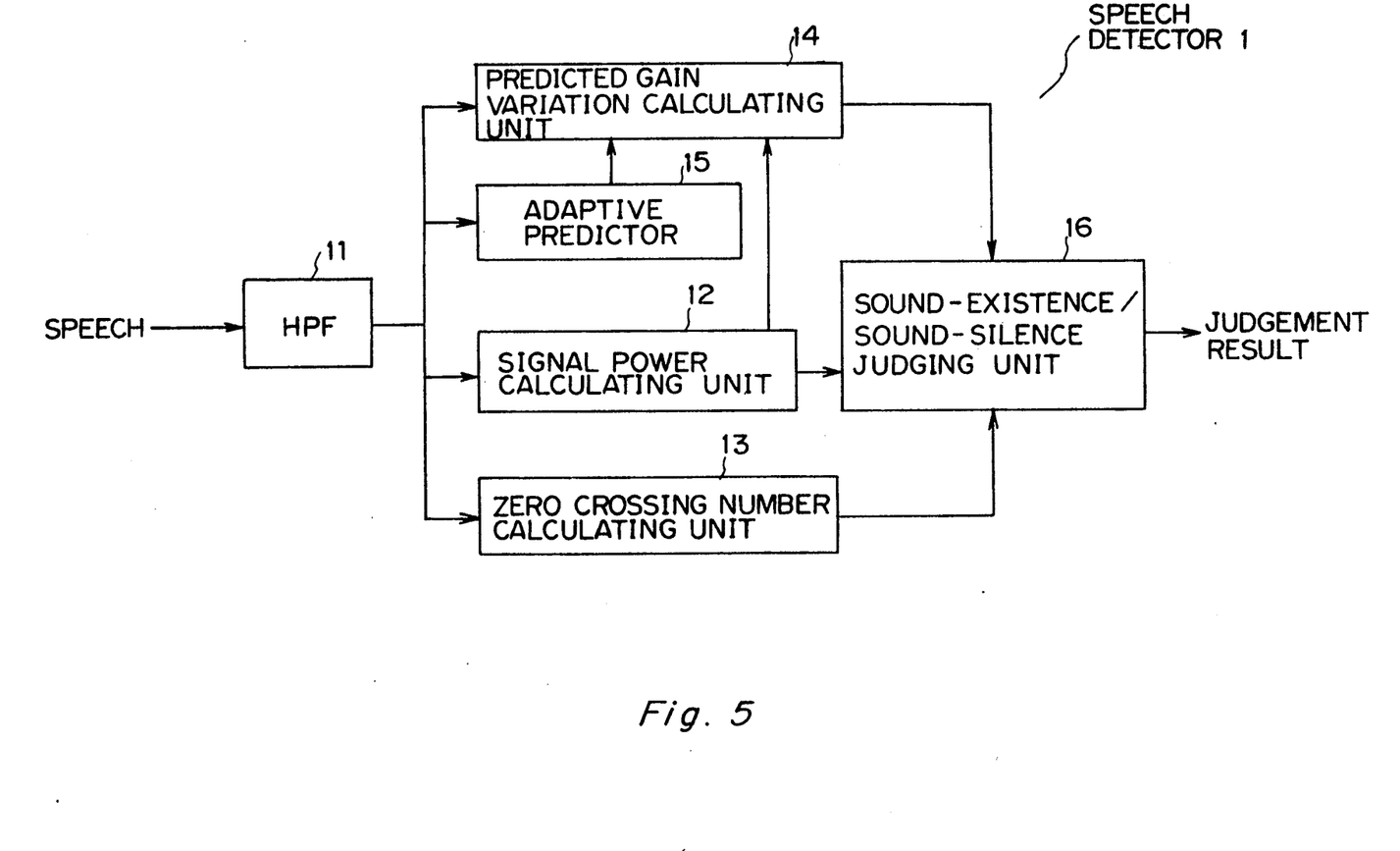
FIG. 5 is a block diagram of a speech detector shown in FIG. 2.

The speech detector 1 is shown in FIG. 5. A speech signal subjected to A/D conversion is input to a high pass filter 11, which deletes a direct current offset of the speech signal caused by the A/D conversion. The speech signal passing through the high pass filter 11 is input to a signal power calculating unit 12, a zero crossing point number calculating unit 13, a predicted gain variation calculating unit 14 and an adaptive predictor 15, in which the speech signal is cut out in a predetermined time interval (frame or block). The signal power P is calculated by the signal power calculating unit 12, the number of zero crossing points (the number of polarity inversions) Z by the zero crossing number calculating unit 13, a predicted gain G and a predicted gain variation D by the predicted gain variation calculating unit 14, and predicted error ε by the adaptive predictor 15, respectively. Further, signal power P, zero crossing number Z, predicted gain G, and predicted gain variation D are respectively input to a sound existence/sound silence judging unit 16.

The signal power calculating unit 12 calculates the signal power P of the input speech frame. The zero crossing point number calculating unit 13 calculates the number of zero crossing points (the number of the polarity inversions) Z, thereby detecting a frequency component of an input speech frame. Adaptive predictor 15 calculates predicted error ε of the input speech frame. The predicted gain variation calculating unit 14 receives the signal power P and the predicted error, ε in addition to the speech frame and, based on the signal power P and the predicted error ε, calculates the predicted gain G and the predicted gain variation D. The predicted gain G is obtained by the equation, $$G = -10 \log_{10}(\Sigma \text{ predicted error } \epsilon^2 / \text{input power } P).$$

The predicted gain variation D is obtained as the difference between the predicted gain G of the present frame and the predicted gain of the previous frame. The sound-existence/sound-silence judging unit 16 judges whether the present speech frame is sound-existing or sound-silent, based on the calculated input power P, number of zero crossing points Z, predicted gain variation D, and so on.

Figure 6:
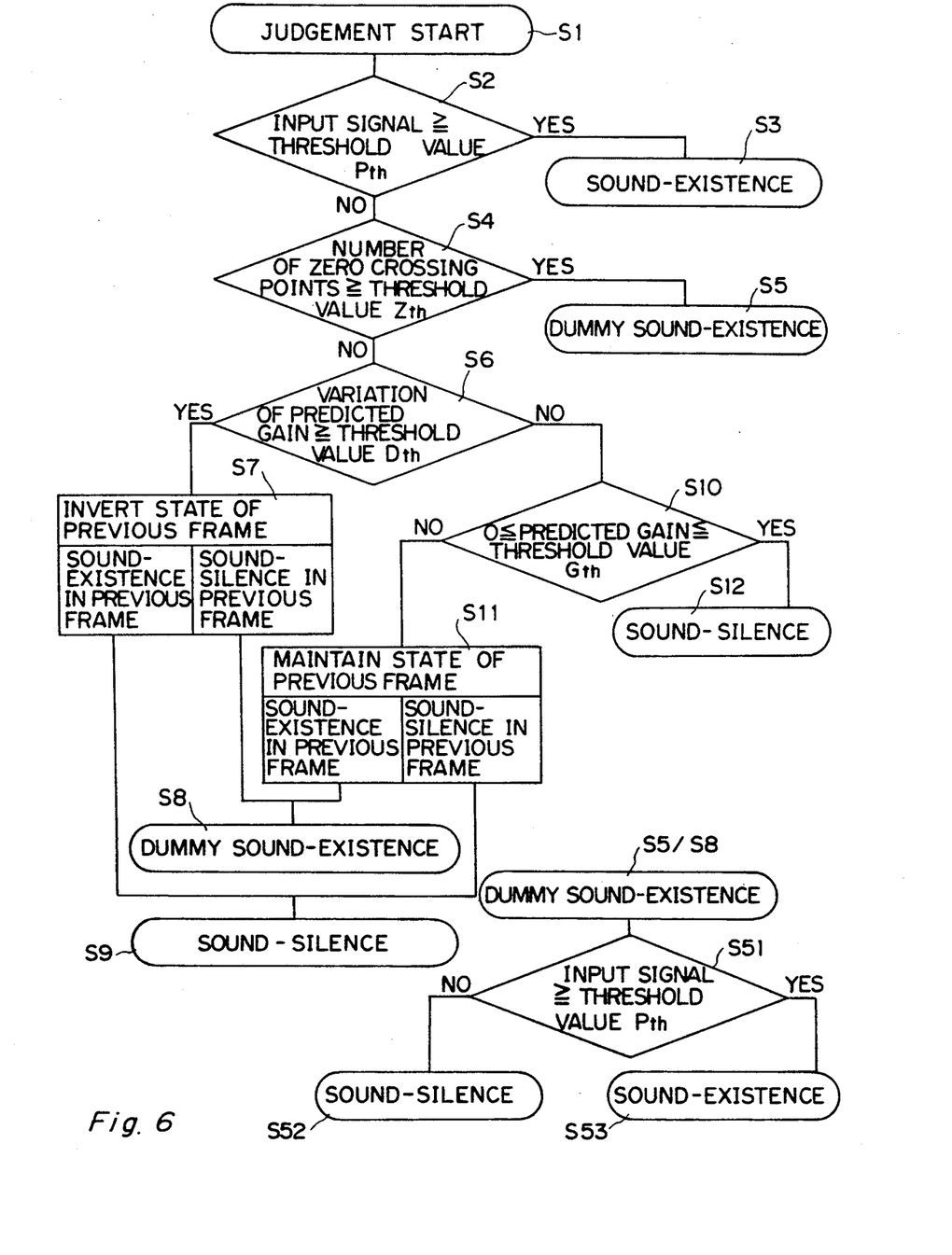
FIG. 6 is a flowchart for determining the sound existence and sound silence periods of the speech signal in a sound-existence/sound-silence judging unit shown in FIG. 5.

The algorithm used in the sound-existence/sound-silence judging unit 16 is shown in FIG. 6. The input speech frame is compared with a predetermined threshold value Pth of input power P and then the number Z of zero crossing points is compared with the predetermined threshold value Zth, thereby performing the judgement of sound-existence/sound-silence (step S2 to S5). In this case, however, when the number Z of zero crossing points is more than threshold value Zth, it is judged as a dummy sound existing (step S5). In this case, the input power P of the input signal is further compared with the second threshold value Pth (step S51) and if it is more than the second threshold value Pth, it is judged as sound-existing and if it is less than the threshold value Pth, then it is judged as sound-silent. In this instance, the second threshold value Pth is used to compulsorily judge that it is sound silent, where the input power is less than idle channel noise, even if the input frame is at first judged as sound-existing. The second threshold value Pth is set to an extremely small value, sufficient for determining that the input speech frame is absolutely sound-silent.

Where, as a result of judging the number of zero crossing points, the judgement as to sound-existence/sound-silence cannot be made, the predicted gain variation D is compared with the threshold value Dth (step S6). Where, as a result of this comparison, the predicted gain variation D is larger than threshold value Dth, the state of the previous frame is inverted, thereby enabling a state of sound-existence/sound-silence of the present frame to be determined. In this case, when the previous frame is sound-silent, the present frame is judged to be a dummy sound-existing (step S8) and the sound-existing/sound-silent judgement of the dummy sound existence can be made (steps S51 to S53).

On the other hand, if the predicted gain variation D is smaller than the threshold value Dth, the absolute value of the predicted gain G of the present frame is compared with the predetermined threshold value Gth.

Where the background noise is at a high level, there is a case where the predicted gain variation D is smaller than the threshold value Dth during the transient period between the sound-existing and sound-silent states. In this case, however, the absolute value of the predicted gain G itself generally has a high sound existing signal and low noise. Therefore, where the absolute value of the predicted gain G is smaller than the predetermined threshold value Gth, this is judged as sound silence (step S12). On the other hand, where the predicted gain G is larger than the predetermined threshold value Gth, the sound existing/sound silent state of the previous frame is used for the sound existing/sound silent state of the present frame (step S11). In this case, where the previous frame is sound existing, the present frame is deemed as the dummy sound existing (step S8) and the sound existing/sound silent judgement of the dummy sound can be made (step S51 to S53). The above detailed process can be modified in various ways. For example, in the above detailed process, when a sound-silent judgement is conducted by using the predicted gain variation "D" and the predicted gain, G the sound existing/sound silent judgement can, at first, be made by the predicted gain variation D and where the judgement cannot be completed by this method, further the sound existence/sound silence is judged by using the absolute value of the predicted gain B. However, the embodiment is not limited to the above recitation. The sound-existing/sound-silent judgement can, for example, be first made by the predicted gain G and then by the predicted gain variation D with regard to the signal which is determined as sound-existing.

In the above process, speech detection can be conducted by using four parameters comprising input power P, the number of zero crossing points Z, predicted gain G and predicted gain variation D. However, the present invention is not limited to these four parameters. Further, either of input power D or the number of zero crossing points Z may be used.

Figure 7:
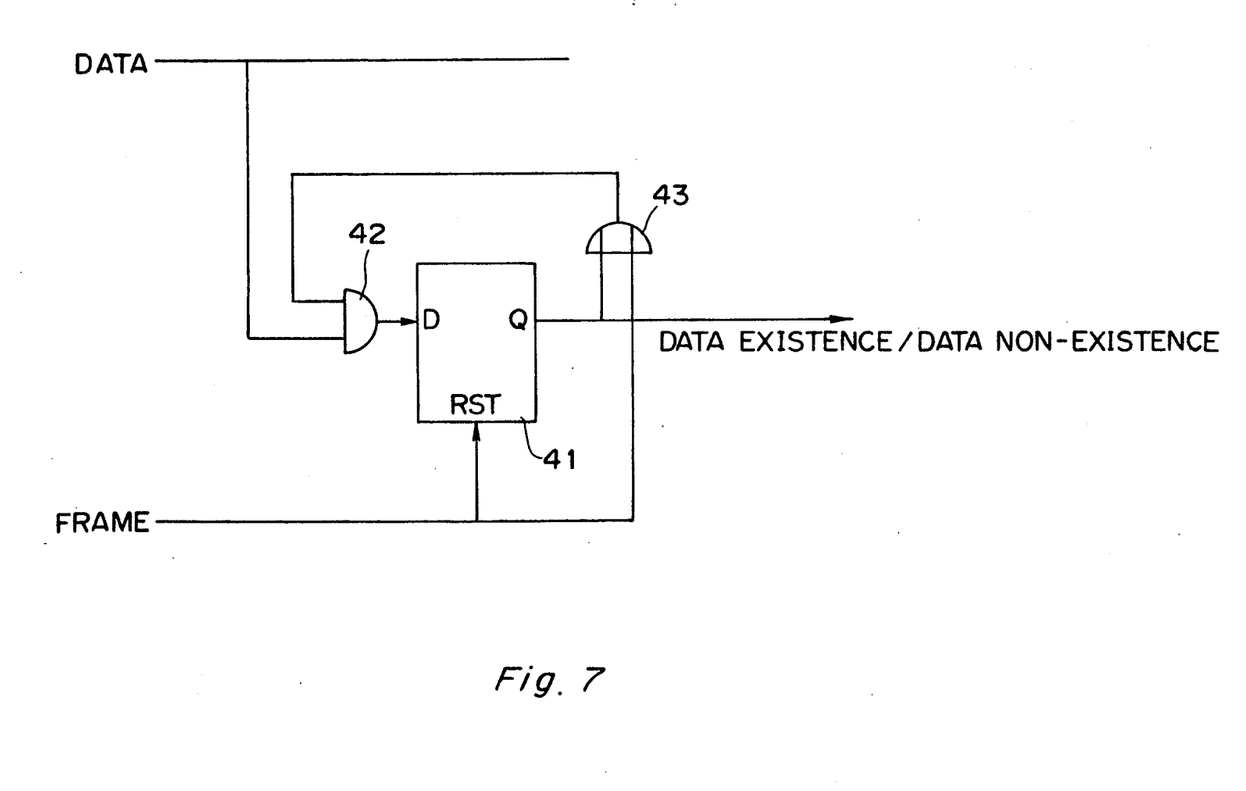
FIG. 7 is a circuit diagram of a fixed pattern detector shown in FIG. 2.

FIG. 7 is a circuit diagram of fixed pattern detector 4, shown in FIG. 2, which detects data non-existence by detecting the continuation of "1" signals during one frame. A head bit of "1" of a frame resets flip-flop 41 and is input to the AND gate 42 through the OR gate 43. When the data is "1", the AND gate 42 produces a "1" signal to the flip-flop 41 and flip-flop 41 thus produces a "1" signal representing data non-existence. This "1" signal is then fed back to the AND gate 42 through the OR gate 43. Therefore, as far as the "1" data continues for one frame, flip-flop 41 continues to produce "1", thereby designating data non existence.

Figure 8:
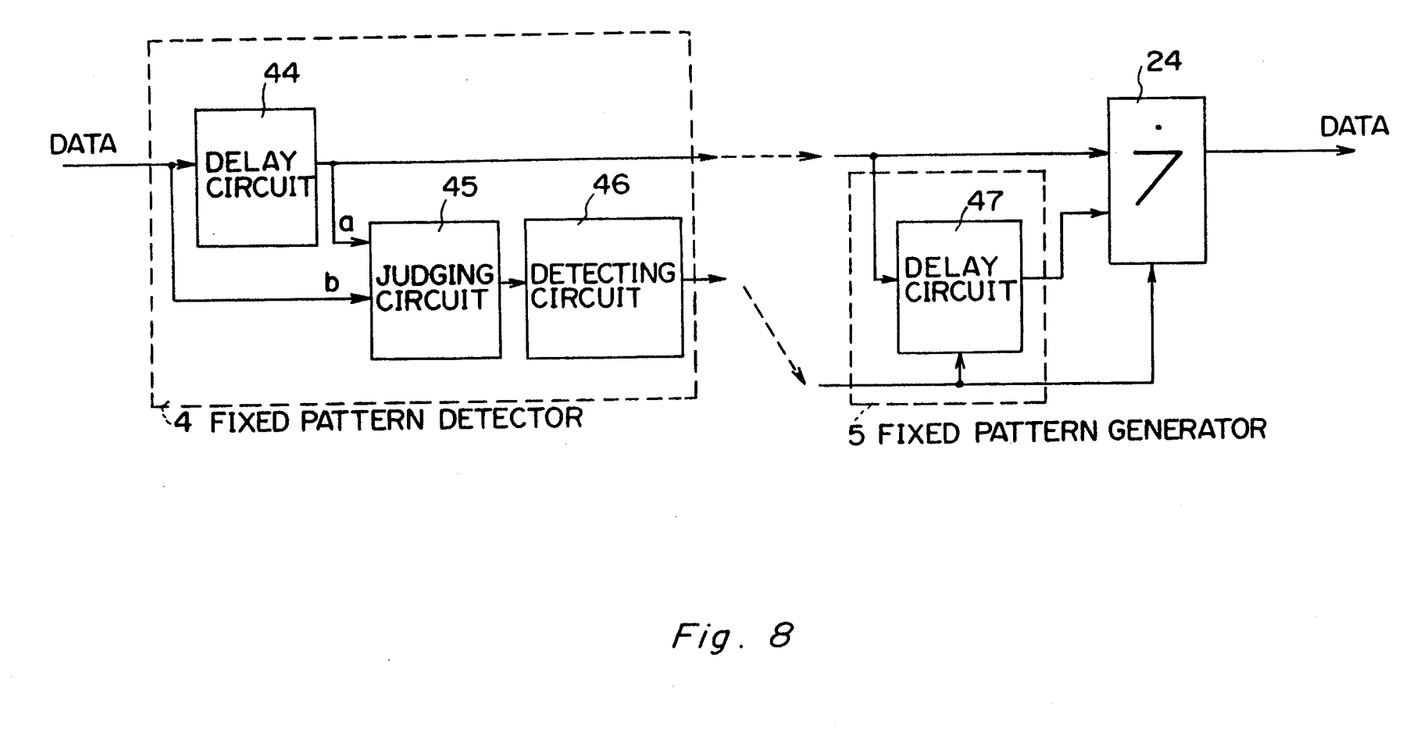
FIG. 8 is a block diagram of a fixed pattern detector and a fixed pattern generator shown in FIG. 2.

FIG. 8 shows an embodiment of the fixed pattern detector 4 and fixed pattern generator 5 shown in FIG. 2. The fixed pattern detector 4 comprises a delay circuit 44 which has a delay time of a predetermined frame, and a judging circuit 45 for judging whether the input data to the delay circuit 44 has the same value as that of the output data thereof, and a detecting circuit 46 for detecting a signal designating that non-speech data not subjected to a packet processing does not exist.

The fixed pattern generator 5 on the receiving side comprises a delay circuit 47 formed by a memory or a cyclic shift register.

Figure 9:
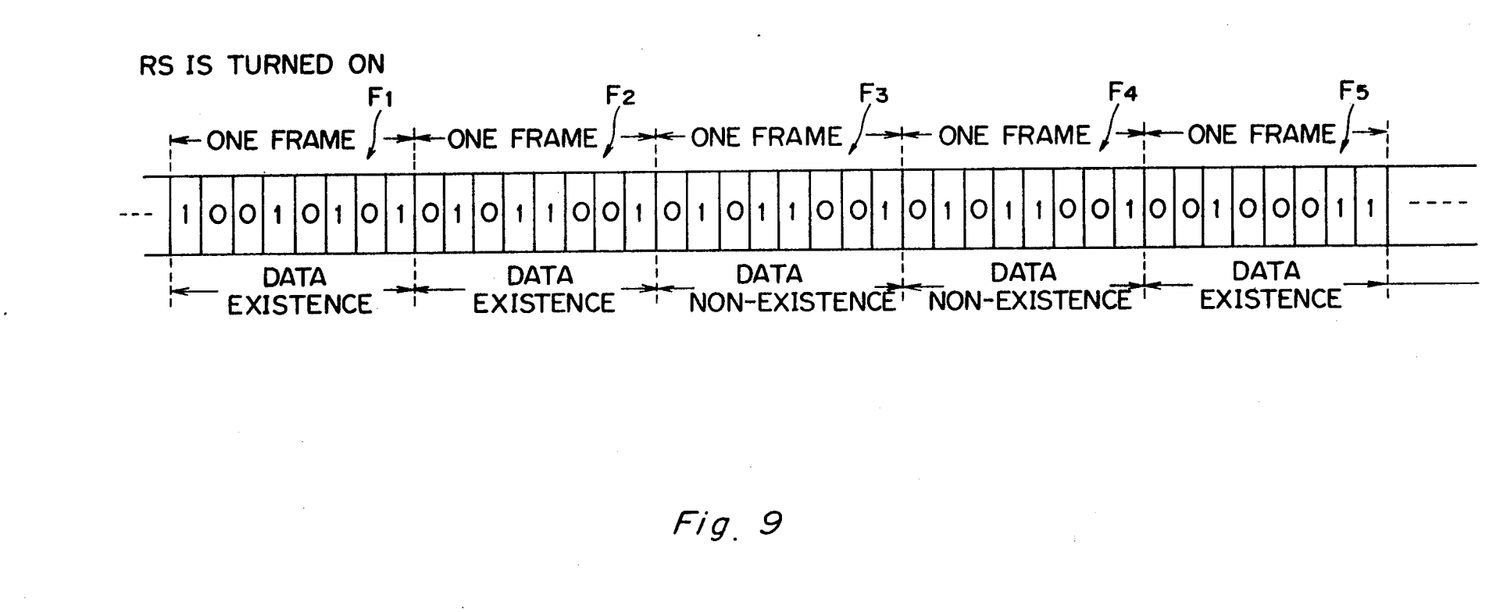
FIG. 9 is a view explaining a manner of determining whether data exists or not.

The data which is not subjected to packet processing is input to the delay circuit 44 and is delayed by a predetermined frame (for example, one frame) and is then supplied to the judging circuit On the other hand, the output of the delay circuit 44 is supplied directly to the judging circuit 45. The judging circuit 45 comprises, for example, an exclusive OR logic circuit and determines whether or not the delayed data a from the delay circuit 44 has the same value as the input non-delay data b from the delay circuit 44. When the input data to the delay circuit 44 is in the sequence F1-F2-F3-F4-F5-... per frame as shown in FIG. 9, frames F2, F3 and F4 have the same pattern and thus the judging circuit 45 continues to produce a judging signal of the value "0" during respective periods for frames F3 and F4, supposing that the delay time of the delay circuit 44 equals to one frame.

The detecting circuit 46 outputs the detection signal of the value "0" representing non-existence of data when the value "0" of the output determining signal of judging circuit 45 continues for a frame. The detection signal is input to the multiplexer 3 shown in FIG. 2, and is multiplexed with a signal designating sound existence/sound silence of the speech data obtained by the speech detector 1, the speech data, the non-speech data or the packet data in a time division manner. Therefore, the multiplexed signal is transmitted to the demultiplexer 71 through the communication line 6. Where the judgement signal "0", does not continue for a whole frame, it is judged that data input exists. The detection signal with a value of "1" is thus outputted from the detecting circuit 46. In this case, the multiplexer 3 transmits the non-speech data which is not subjected to a packet process, the detection signal and the speech data (or packet data).

The fixed pattern generator 5 comprises a delay circuit 47 formed by a memory. When the value of the detection signal is "1", the delay circuit 47 writes input data for one frame period into the memory. When the value of the detection signal becomes "0", the writing operation stops and previous packet data which is maintained in the memory, is not subjected to a packet process but is output to the selector 24. The selector 24 is controlled by the output from the detecting circuit 46 through the demultiplexer 71. When the value of the detection signal is "0", the delay circuit 47 produces the delayed data which is not subjected to the packet process. When the detecting circuit 46 outputs "1", representing the value of the existence of data, thereby enabling the present non-speech data which is not subjected to the packet process to be supplied to the selector 24 from the selector 72.

In this embodiment, existence or non-existence of data which is not packeted is determined based on whether the data of the present frame is the same as that of the previous frame, and transmits a detection signal of one bit from the transmitting side to the receiving side. Therefore, an accurate judgment is made of whether or not the data which is not packeted exists, irrespective of the kind of terminal. Namely, even when terminal provided at the input of the transmitting side produces all "1" signal for successive two frames as the non-speech signal which is not subjected to the packet process does not exist, the detecting signal from the detecting circuit 46 becomes "0", thereby showing that the non-speech data does not exist, and enabling the delay circuit 47 to produce all "1" signal stored previously in the memory of the delay circuit 47.

Figure 10:
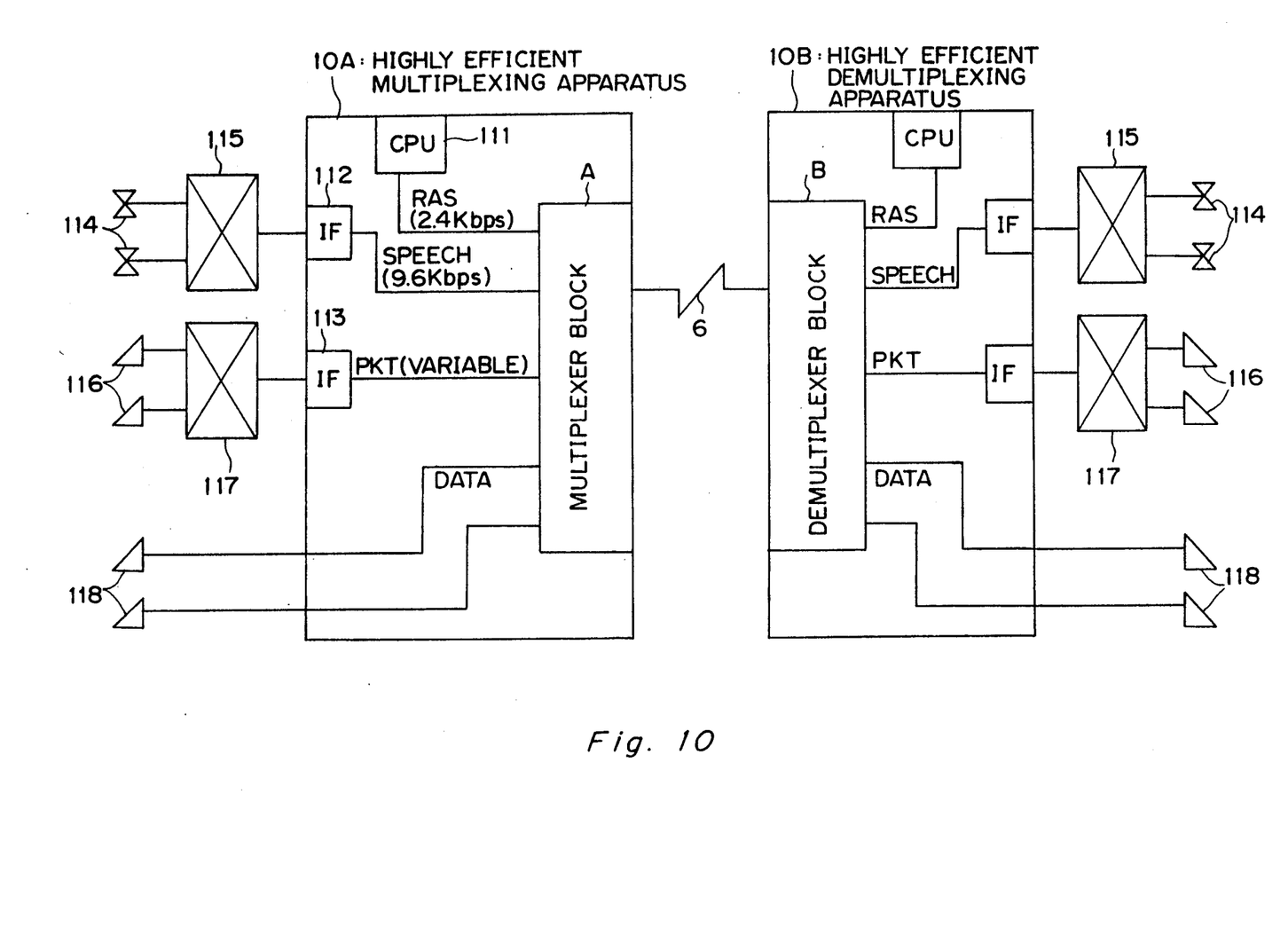
FIG. 10 is a block diagram of an embodiment of the present invention.

FIG. 10 shows a practical embodiment of the present invention. This embodiment comprises a highly efficient multiplexing apparatus 10A provided with a multiplexer block A, and a highly efficient demultiplexing apparatus 10B provided with a demultiplexer block B. The multiplexing apparatus 10A includes a processor (CPU) 111 for producing monitoring and controlling data (RAS) of a communication line, an interface 112 for speech, and an interface 113 for packet data (PKT). Ordinary telephones 114 and an exchange 115 are therefore connected to the interface 112. The PKT terminal 116 and a packet exchange 117 are connected to the interface 113. Terminals 118 are provided for data which is not formed into packet data.

In this embodiment, an RAS of 2.4 kbps is inserted into a sound-silent period of 9.6 kbps speech with a particular priority, and packet data PKT is multiplexed in the remaining 7.2 kbps. The feature in which the packet data PKT is multiplexed on a data line during the period when the data from the terminal 118 does not exist, has been explained above with reference to FIG. 2.

As explained above, according to the present invention, non-speech data requiring a quick response is not subjected to a packet assembling process but is assigned a communication line (time slot) in the same manner as for the speech data PKT, and is thereby transmitted in a multiplexed manner. The packet data is inserted into the sound-silent period of the speech data and the data-non-existing period of the non-speech data, thereby enabling the non-speech data requiring a quick response to be transmitted with a quick response and greatly improving the multiplexing efficiency.

In the above embodiment, the packet data PKT is inserted into the sound-silent period of the speech signal or into the period of data non-existence of the non-speech data. However, it is apparent that packet data PKT can be inserted only into the period of the non-existence of the non-speech data which requires a quick response. In this case an embodiment of the highly efficient multiplexing apparatus comprises means for detecting the non-existence of non-speech data and means for inserting the packet data PKT into the period of non-existence of non-speech data. This embodiment comprises the packet data PKT, non-speech data DATA, selector 23, fixed pattern detector 4, multiplexer 3, communication line 6, demultiplexer 71, selector 72, selector 24, and fixed pattern generator 5, which are shown in FIG. 2. The non-speech data is multiplexed for transmission on the transmission side and the multiplexed non-speech data is demultiplexed on the receiving side. In this embodiment, it is also possible to enable the non-speech data to be transmitted with a quick response.

What is claimed is:

1. A highly efficient multiplexing system for multiplexing a speech signal, packet data and non-speech data, wherein the non-speech data is not packeted data having a higher priority than the packet data, comprising:

first detection means for detecting one of a sound-existing period and a sound-silent period of the speech signal;

first insertion means for inserting the packet data into a speech time slot during the sound-silent period of the speech signal detected by said first detection means;

means for providing a data time slot for the non-speech data to enable the non-speech data to be multiplexed with the speech signal;

second detection means for detecting a data existence and a data non-existence of the non-speech data by detecting whether a fixed pattern continues in the non-speech data for a predetermined period; and second insertion means for inserting the packet data into the data time slot of the non-speech data when the existence of the non-speech data is detected by said second detection means.

2. The highly efficient multiplexing system according to claim 1, further comprising noise generator means, provided on a receiving side, for generating a noise signal when the receiving side receives signals obtained by inserting the packet data into the sound-silent period.

3. The highly efficient multiplexing system according to claim 1, wherein said second detection means outputs a non-speech data non-existence signal, and wherein said system further comprises fixed pattern generator means, provided on a receiving side, for producing the fixed pattern representing non-speech data non-existence when the receiving side receives the non-speech data non-existence signal.

4. The highly efficient multiplexing system according to claim 1, wherein said first detection means comprises:

means for dividing the speech signal into a plurality of frames;

means for detecting a predicted gain of a present frame;

means for detecting a variation of the predicted gain between the present frame and a previous frame; and judging means for judging sound-existence/sound-silence of the present frame by comparing the predicted gain and the variation of the predicted gain of the present frame with respective threshold values.

5. The highly effective multiplexing system according to claim 4, wherein said judging means performs a determination of sound-existence/sound-silence based on the predicted gain of the present frame which has already been judged as sound-silent based on the variation of the predicted gain.

6. The highly efficient multiplexing system according to claim 4, wherein said judging means performs a determination of the sound-existence/sound-silence based on the variation of the predicted gain of the present frame which has already been judged to be sound-existing based on the predicted gain.

7. The highly efficient multiplexing system according to claim 1, wherein said second detection means outputs a non-speech data non-existence signal, and wherein said fixed pattern detector means comprises:

an AND circuit for receiving the input data and producing an output;

a flip-flop circuit for receiving the output of said AND circuit, said flip-flop circuit including a reset terminal and an output terminal for outputting the non-speech data non-existence signal;

an OR circuit having a first input terminal operatively connected to the output terminal of said flip-flop circuit for transmitting the non-speech data non-existence signal to said AND circuit; and means for providing a frame signal, having a head bit, to the reset terminal of said flip-flop circuit and a second input terminal of said OR circuit so that when the head bit of the frame signal is applied to said AND circuit through said OR circuit, said flip-flop circuit continues to output a "1" signal as long as the input data to said AND circuit continues to be "1".

8. The highly efficient multiplexing system according to claim 1, wherein said second detection means comprises:

delay circuit means for delaying the non-speech data by a predetermined frame to produce delayed non-speech data;

judging means for indicating whether the non-speech data and the delayed non-speech data have the same value; and means for providing a detection signal designating the non-speech data does not exist when said judging means indicates the non-speech data and the delayed non-speech data have the same value for a predetermined frame.

9. The highly efficient multiplexing system according to claim 8, further comprising means for outputting the data of a previous frame when it receives the detection signal designating that the data not subjected to a packet process does not exist and for outputting the data of a present frame when the detection signal indicates that the data not subjected to a packet process exists.

10. The highly efficient multiplexing system according to claim 1, wherein data indicating whether a data time-slot is for non-speech data or for packet data is provided before the data time-slot of multiplexed data.

11. The highly efficient multiplexing system according to claim 10, wherein data indicating whether the speech time-slot is for speech data or for packet data is provided before the speech time-slot.

12. The highly efficient multiplexing system according to claim 10, wherein data indicating whether or not a time-slot is valid is provided before the time-slot.

13. A highly efficient multiplexing system for multiplexing at least packet data and non-speech data, wherein the non-speech data is not packeted data having a higher priority than the packet data, comprising:

means for providing a data time slot for the non-speech data;

detection means for detecting a non-speech data existence and a non-speech data non-existence by detecting whether a fixed pattern continues in the non-speech data for a predetermined period; and insertion means for inserting the packet data into the data time slot of the non-speech data when the non-speech data non-existence is detected by said detection means.

14. The highly efficient multiplexing system according to claim 13.

wherein said detection means outputs a non-speech data non-existence signal, and wherein said system further comprises fixed patterned generator means, provided on a receiving side, for producing the fixed pattern representing non-speech data non-existence when the receiving side receives non-speech data non-existence signal.

15. The highly efficient multiplexing system according to claim 14, wherein said detection means outputs a non-speech data non-existence signal, and wherein said fixed pattern detector means comprises:

an AND circuit for receiving the input data and producing an output;

a flip-flop circuit for receiving the output of said AND circuit, said flip-flop circuit including a reset terminal and an output terminal for outputting the non-speech data non-existence signal;

an OR circuit having a first input terminal operatively connected to the output terminal of said flip-flop circuit for transmitting the non-speech data non-existence signal to said AND circuit, and means for providing a frame signal, having a head bit, to the reset terminal of said flip-flop circuit and a second input of said OR circuit so that when the head bit of the frame signal is applied to said AND circuit through said OR circuit, said flip-flop circuit continues to output a "1" signal as long as the input data to said AND circuit continues to be "1".

16. The highly efficient multiplexing system according to claim 13, wherein said detection means comprises:

delay circuit means for delaying the non-speech data by a predetermined frame to produce delayed non-speech data;

judging means for indicating whether the non-speech data and the delayed non-speech data have the same value; and means for providing a detection signal designating the non-speech data does not exist when said judging means indicates the non-speech data and the delayed non-speech data have the same value for a predetermined frame.

17. The highly efficient multiplexing system according to claim 16, further comprising means for outputting the data of a previous frame when it receives the detection signal designating that the data not subjected to a packet process does not exist and for outputting the data of a present frame when the detection signal indicates that the data not subjected to a packet process exists.

18. The highly efficient multiplexing system according to claim 13, wherein data indicating whether a data time-slot is for non-speech data or for packet data is provided before the data time-slot.

19. The highly efficient multiplexing system according to claim 13, wherein data indicating whether or not a time-slot is valid is provided before the time-slot.

20. A transmission system, comprising:

multiplexing means for receiving a speech signal, packet data and non-speech data and for producing a multiplexed transmission signal including at least a speech time slot and a data time slot, wherein the non-speech data is not packeted data having a higher priority than the packet data, said multiplexing means includes at least:

data detection means for receiving the non-speech data, for detecting one of a data-existing period and a data non-existing period by detecting whether a fixed pattern continues in the non-speech data for a predetermined period, and for outputting a data existing/non-existing signal;

data selection means for receiving the data existing/non-existing signal and for selecting one of the packet data and the non-speech data as first selected data based on the data existing/non-existing signal; and data insertion means for inserting the first selected data into the data time slot of the multiplexed transmission signal.

21. A transmission system according to claim 20, wherein the multiplexed transmission signal contains one of the speech signal and the packet data in the speech time slot, and contains one of the non-speech data and the packet data in the data time slot.

22. A transmission system according to claim 21, wherein said transmission system further comprises:

speech detection means for receiving the speech signal, for detecting one of a speech-existing period and a speech-non-existing period, and for outputting a speech existing/non-existing signal;

speech selection means for receiving the speech existing/non-existing signal and for selecting one of the speech signal and the packet data as second selected data based on the speech existing/non-existing signal; and speech insertion means for inserting the second selected data into the speech time slot of the multiplexed transmission signal.

23. A transmission system according to claim 22, wherein the multiplexed transmission signal further includes the data existing/non-existing signal and the speech existing/non-existing signal.

24. A transmission system according to claim 23, wherein said transmission system further comprises:

demultiplexing means for receiving the multiplexed transmission signal and for reproducing at least the speech signal, the packet data, the non-speech data, the data existing/non-existing signal and the speech existing/non-existing signal from the multiplexed transmission signal, said demultiplexing means includes at least:

speech output means for outputting the speech signal when the speech existing/non-existing signal indicates the speech-existing period;

packet data output means for outputting the packet data when one of the speech existing/non-existing signal indicates the speech-non-existing period and the data existing/non-existing signal indicates the data-non-existing period; and non-speech data output means for outputting the non-speech data when the data existing/non-existing signal indicates the data-existing period.

25. A method for transmitting a multiplexed signal having at least a speech time slot and a data time slot, said method comprising the steps of:

(a) receiving a speech signal, packet data and non-speech data, wherein the non-speech data is not packeted data having a higher priority than the packet data;

(b) detecting one of a data-existing period and a data non-existing period by detecting whether a fixed pattern continues in the non-speech data for a predetermined period;

(c) producing a data existing/non-existing signal based on said detecting in step (b);

(d) selecting one of the packet data and the non-speech data as first selected data based on the data existing/non-existing signal;

(e) inserting the first selected data into the data time slot of the multiplexed transmission signal; and (f) transmitting the multiplexed transmission signal.

26. A method according to claim 25, wherein the multiplexed transmission signal contains one of the speech signal and the packet data in the speech time slot, and contains one of the non-speech data and the packet data in the data time slot, and wherein said method further comprises the steps of:

(g) detecting one of a speech-existing period and a speech-non-existing period in the speech signal;

(h) producing a speech existing/non-existing signal based on said detecting in step (g);

(i) selecting one of the speech signal and the packet data as second selected data based on the speech existing/non-existing signal; and (9) inserting the second selected data into the speech time slot of the multiplexed transmission signal.

27. A transmission system, comprising:

demultiplexing means for receiving a multiplexed transmission signal including at least a speech signal, packet data, non-speech data, a data existing/non-existing signal and a speech existing/non-existing signal, wherein the non-speech data is not packeted data having a higher priority than the packet data, said demultiplexing means comprising:

speech output means for outputting the speech signal when the speech existing/non-existing signal indicates a speech-existing period;

packet data output means for outputting the packet data when one of the speech existing/non-existing signal indicates a speech-non-existing period and the data existing/non-existing signal indicates a data-non-existing period;

fixed pattern generating means for generating a fixed pattern; and non-speech data output means for outputting the non-speech data when the data existing/non-existing signal indicates a data-existing period and for outputting the fixed pattern when the data existing/non-existing signal indicates the data-non-existing period.

* * * * *

UNITED STATES PATENT AND TRADEMARK OFFICE
CERTIFICATE OF CORRECTION

PATENT NO. : 5,121,385

DATED : June 9, 1992

INVENTOR(S) : Tominaga et al.

It is certified that error appears in the above-identified patent and that said Letters Patent is hereby corrected as shown below:

Col. 1, line 23, after "of" insert --digitized speech. Fig. 1 is an explanatory drawing of a--.

Col. 2, line 9, after "the" (second occurrence) insert --first--.

Col. 6, line 22, ""D"" should be --D--;
line 27, "B" should be --G--;
line 68, "circuit" should be --circuit "45."--.

Col. 8, line 23, delete "PKT".
line 24, after "data" insert --PKT--.

Signed and Sealed this

Thirty-first Day of August, 1993

Attest:

BRUCE LEHMAN

Attesting Officer  Commissioner of Patents and Trademarks